US012671817B2

(12) United States Patent
Yang

(10) Patent No.: US 12,671,817 B2
(45) Date of Patent: Jun. 30, 2026

(54) METHOD AND MODULE FOR CONTROLLING CODE RATE OF ENCODER, AND CHIP, ELECTRONIC DEVICE AND STORAGE MEDIUM

(71) Applicant: AMLOGIC (SHANGHAI) CO., LTD., Shanghai (CN)

(72) Inventor: Zipan Yang, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/874,568

(22) PCT Filed: Aug. 30, 2022

(86) PCT No.: PCT/CN2022/115938
§ 371 (c)(1),
(2) Date: Dec. 12, 2024

(87) PCT Pub. No.: WO2023/240799
PCT Pub. Date: Dec. 21, 2023

(65) Prior Publication Data
US 2025/0365428 A1     Nov. 27, 2025

(30) Foreign Application Priority Data

Jun. 14, 2022     (CN) .......................... 202210666181.6

(51) Int. Cl.
*H04N 19/147*          (2014.01)
*H04N 19/115*          (2014.01)
*H04N 19/172*          (2014.01)

(52) U.S. Cl.
CPC ......... *H04N 19/147* (2014.11); *H04N 19/115* (2014.11); *H04N 19/172* (2014.11)

(58) Field of Classification Search
CPC .. H04N 19/147; H04N 19/115; H04N 19/172; H04N 19/117; H04N 19/124;
(Continued)

(56) References Cited

U.S. PATENT DOCUMENTS 4,047,221 A     9/1977  Yasuda et al.
5,005,076 A     4/1991  Stroppina et al.
(Continued)

FOREIGN PATENT DOCUMENTS

CN          101018341 A     8/2007
CN          102724507 A     10/2012
(Continued)

OTHER PUBLICATIONS

Office Action issued in Chinese Application No. 202210666181.6, dated Mar. 24, 2023.
(Continued)

*Primary Examiner* — James M Pontius
(74) *Attorney, Agent, or Firm* — Knobbe, Martens, Olson & Bear, LLP

(57)          ABSTRACT

A method and module for controlling the code rate of an encoder, and a chip, an electronic device and a storage medium. The method for controlling the code rate of an encoder comprises: when it is detected that an image processor receives an image frame to be processed, acquiring the state of a buffer pool; acquiring a corresponding noise reduction intensity according to the state of the buffer pool; and outputting the acquired noise reduction intensity to the image processor, so that the image processor performs noise reduction processing on the image frame by using the acquired noise reduction intensity, and outputting an image frame, which has been subjected to noise reduction processing, to an encoder, so that the encoder performs encoding processing on the image frame, which has been subjected to
(Continued)

Obtain a buffer pool state when it is detected that an image signal processor receives a to-be-processed image frame          /— S110

Obtain a corresponding denoising intensity according to the buffer pool state          /— S120

Output the obtained denoising intensity to the image signal processor, to enable the image signal processor to denoise the to-be-processed image frame by using the obtained denoising intensity, and output a denoised image frame to an encoder, to enable the encoder to encode the denoised image frame          /— S130

Obtain a corresponding quantization parameter according to the buffer pool state          /— S140

Output the obtained quantization parameter to the encoder, to enable the encoder to quantize the denoised image frame by using the quantization parameter          /— S150 noise reduction processing. By means of the solution of the present application, the balance between image quality and an output code rate can be realized while an encoder has a low output code rate.

17 Claims, 2 Drawing Sheets

(58) Field of Classification Search
CPC ...... H04N 19/86; H04N 19/42; H04N 19/103; H04N 19/146; H04N 19/91
See application file for complete search history.

(56) References Cited

U.S. PATENT DOCUMENTS

| | | | |
|---|---|---|---|
| 5,010,401 A | 4/1991 | Murakami et al. | |
| 5,134,476 A | 7/1992 | Aravind et al. | |
| 5,986,710 A | 11/1999 | Kim et al. | |
| 6,628,713 B1 | 9/2003 | Kojima et al. | |
| 7,099,389 B1 * | 8/2006 | Yu | H04N 19/115 |
| | | | 375/240.06 |
| 11,134,256 B1 | 9/2021 | Ramachandran et al. | |
| 2005/0123037 A1 | 6/2005 | Kondo et al. | |
| 2006/0280243 A1 | 12/2006 | Ito et al. | |
| 2008/0232459 A1 * | 9/2008 | Auyeung | H04N 19/147 |
| | | | 375/E7.181 |

| | | | |
|---|---|---|---|
| 2014/0359175 A1 | 12/2014 | Butters | |
| 2014/0376616 A1 * | 12/2014 | Li | H04N 19/154 |
| | | | 375/240.03 |
| 2022/0060753 A1 * | 2/2022 | Szegedi | H04N 21/631 |

FOREIGN PATENT DOCUMENTS

| | | |
|---|---|---|
| CN | 102986212 A | 3/2013 |
| CN | 105208390 A | 12/2015 |
| CN | 113014838 A | 6/2021 |
| JP | H03250884 A | 11/1991 |
| JP | H05227513 A | 9/1993 |
| JP | 2005286594 A | 10/2005 |
| JP | 2005303710 A | 10/2005 |
| JP | 2010213187 A | 9/2010 |
| WO | WO 199901979 A2 | 1/1999 |
| WO | WO 2007/145137 A1 | 12/2007 |

OTHER PUBLICATIONS

Office Action issued in Chinese Application No. 202210666181.6, dated Sep. 28, 2023.
Office Action issued in Chinese Application No. 202210666181.6, dated Dec. 22, 2023.
International Search Report received in International Application No. PCT/CN2022/115938 dated Jan. 28, 2023.

* cited by examiner

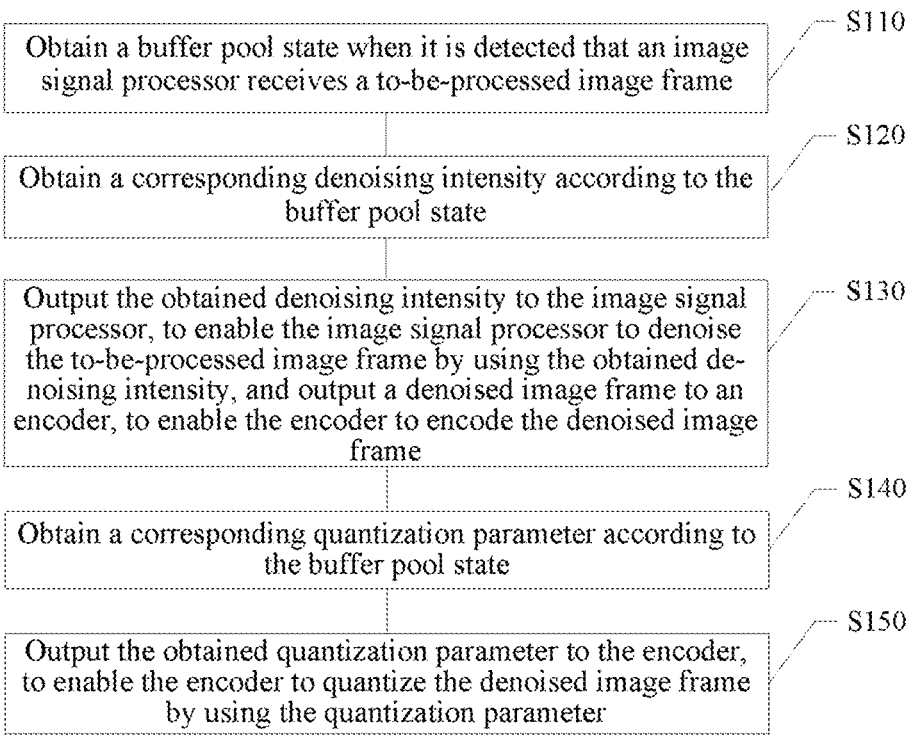

Obtain a buffer pool state when it is detected that an image signal processor receives a to-be-processed image frame ⟋ S110

Obtain a corresponding denoising intensity according to the buffer pool state ⟋ S120

Output the obtained denoising intensity to the image signal processor, to enable the image signal processor to denoise the to-be-processed image frame by using the obtained de-noising intensity, and output a denoised image frame to an encoder, to enable the encoder to encode the denoised image frame ⟋ S130

Obtain a corresponding quantization parameter according to the buffer pool state ⟋ S140

Output the obtained quantization parameter to the encoder, to enable the encoder to quantize the denoised image frame by using the quantization parameter ⟋ S150

FIG. 1

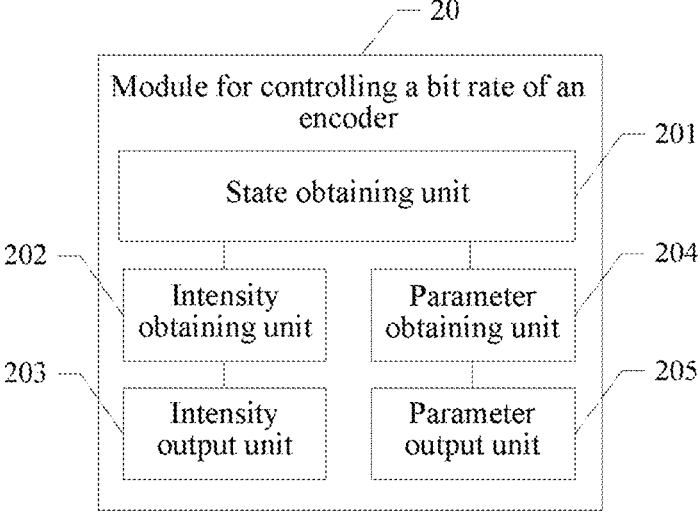

⟋ 20

Module for controlling a bit rate of an encoder

State obtaining unit ⟋ 201

202 — Intensity obtaining unit

204 — Parameter obtaining unit

203 — Intensity output unit

205 — Parameter output unit

FIG. 2

METHOD AND MODULE FOR CONTROLLING CODE RATE OF ENCODER, AND CHIP, ELECTRONIC DEVICE AND STORAGE MEDIUM

TECHNICAL FIELD

The present invention relates to the field of image processing technologies, and in particular, to a method and a module for controlling a bit rate of an encoder, a chip, an electronic device, and a storage medium.

BACKGROUND

With the continuous development of network technologies, videos are increasingly applied to various industries. The volume of video data is huge. In actual application, video data usually needs to be compressed and coded. An encoder processes video data through processes of prediction, transform, quantization, and entropy encoding, to compress the data to generate a video bitstream. The video bitstream may be used for storage or network transmission. A decoder performs a decoding operation on the video bitstream through entropy decoding, inverse quantization, inverse transform, and prediction compensation, to reconstruct the video data.

However, in a case of a low bit rate, a requirement of an existing method for controlling a bit rate of an encoder to meet the low bit rate leads to low quality of an encoded image.

SUMMARY

A problem to be resolved by the present invention is to provide a method and a module for controlling a bit rate of an encoder, a chip, an electronic device, and a storage medium, to achieve a balance between image quality and an output bit rate under a condition of meeting a low output bit rate of an encoder.

Technical solution

To resolve the foregoing problem, an embodiment of the present invention provides a method for controlling a bit rate of an encoder, including:

obtaining a buffer pool state when it is detected that an image signal processor receives a to-be-processed image frame;

obtaining a corresponding denoising intensity according to the buffer pool state; and outputting the obtained denoising intensity to the image signal processor, to enable the image signal processor to denoise the image frame by using the obtained denoising intensity, and outputting a denoised image frame to an encoder, to enable the encoder to encode the denoised image frame.

Correspondingly, an embodiment of the present invention further provides a module for controlling a bit rate of an encoder, including:

a state obtaining unit, configured to obtain a buffer pool state when it is detected that an image signal processor receives a to-be-processed image frame;

an intensity obtaining unit, configured to obtain a corresponding denoising intensity according to the buffer pool state; and an intensity output unit, configured to output the obtained denoising intensity to the image signal processor, to enable the image signal processor to denoise the image frame by using the obtained denoising intensity, and output a denoised image frame to an encoder, to enable the encoder to encode the denoised image frame.

Correspondingly, an embodiment of the present invention further provides a chip, where the chip is integrated with the module for controlling a bit rate of an encoder according to any one of the foregoing.

Correspondingly, an embodiment of the present invention further provides an electronic device, including at least one memory and at least one processor, where the memory stores one or more computer instructions, and the one or more computer instructions are executed by the processor to implement the method for controlling a bit rate of an encoder according to any one of the foregoing.

Correspondingly, an embodiment of the present invention further provides a storage medium, where the storage medium stores one or more computer instructions, and the one or more computer instructions are used to implement the method for controlling a bit rate of an encoder according to any one of the foregoing.

Beneficial Effect

Compared with the prior art, the technical solutions of the embodiments of the present invention have the following advantages: In the method for controlling a bit rate of an encoder in the embodiments of the present invention, the denoising intensity of the image signal processor is adjusted by using the buffer pool state, and a data volume of a noisy point in an image frame outputted by the image signal processor can be controlled according to an actual requirement, so that the data volume of the image frame inputted to the encoder is controlled from the source, and exchanging image quality for a balance of an output bit rate of the encoder under a condition of a low output bit rate can be effectively avoided. Therefore, a better balance between the image quality and the output bit rate can be achieved.

BRIEF DESCRIPTION OF THE DRAWINGS

FIG. 1 is a schematic flowchart of a method for controlling a bit rate of an encoder according to an embodiment of the present invention.

FIG. 2 is a schematic structural diagram of a module for controlling a bit rate of an encoder according to an embodiment of the present invention.

DETAILED DESCRIPTION

Figure 3:
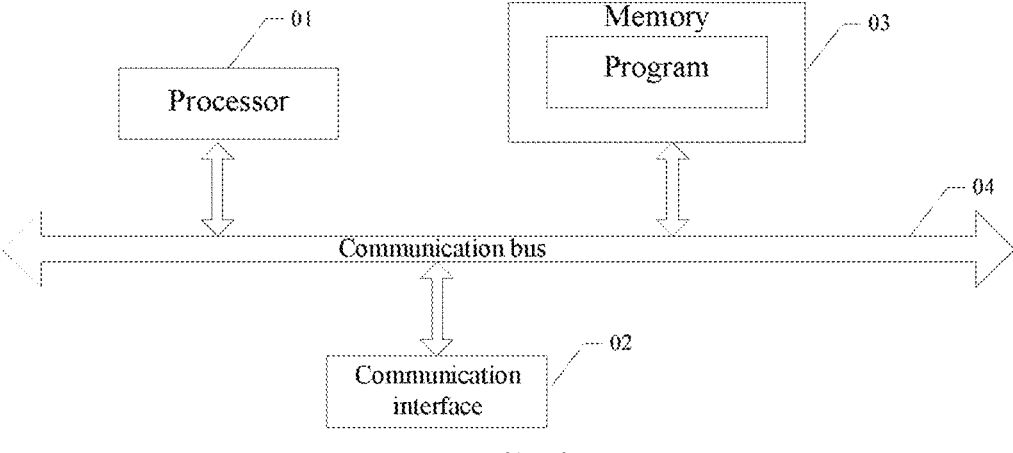
FIG. 3 is a diagram of a hardware structure of a device according to an embodiment of the present invention.

It can be learned from the background that, on the premise of satisfying a low bit rate, an existing method for controlling a bit rate of low-bit-rate encoding may result in low quality of an outputted image. The reason is described with reference to a method for controlling a bit rate of low-bit-rate encoding.

An encoder processes video data through processes of prediction, transform, quantization, and entropy encoding, to compress the video data to generate encoded data. A generated video bitstream is first buffered in a buffer pool, and then sequentially transmitted to a video decoder through a channel. The video decoder performs a decoding operation on the video bitstream through entropy decoding, inverse quantization, inverse transform, and prediction compensation, to reconstruct the video data.

Theoretically, the encoded data in the buffer pool increases at a constant rate, and therefore can be outputted at a constant rate. However, complexity of each image frame in the video data varies. When a previous image frame is excessively complex, for example, scenarios are continuously switched for a plurality of times, an exposure parameter is continuously switched for a long time, or noisy points suddenly increase, the volume of encoded data generated by the encoder increases, causing the encoded data in the buffer pool to increase instantaneously. If this situation lasts for a period of time, the volume of encoded data in the buffer pool exceeds a rated capacity of the buffer pool, causing the encoded data to overflow, resulting in frame loss or network congestion.

To deal with such a situation, it is common practice to adjust a quantization parameter QP_INDEX of a subsequent image frame according to the volume of data in a buffer pool by using a specific algorithm and a specific policy, to degrade image quality in exchange for stability of a bit rate. When an output bit rate requirement is high, the output bit rate can be significantly balanced by adjusting the quantization parameter QP_INDEX of the subsequent image frame. However, under the condition of a low output bit rate, a consequence of this practice is that the quantization parameter QP_INDEX of the subsequent image frame is abnormally high, causing severe image distortion.

To resolve the foregoing problem, an embodiment of the present invention provides a method for controlling a video bit rate, including: obtaining a buffer pool state when it is detected that an image signal processor receives a to-be-processed image frame; obtaining a corresponding denoising intensity according to the buffer pool state: and outputting the obtained denoising intensity to the image signal processor, to enable the image signal processor to denoise the image frame by using the obtained denoising intensity, and outputting a denoised image frame to an encoder, to enable the encoder to encode the denoised image frame.

In the method for controlling a bit rate of an encoder in the embodiments of the present invention, the denoising intensity of the image signal processor is adjusted by using the buffer pool state, and a data volume of a noisy point in an image frame outputted by the image signal processor can be controlled according to an actual requirement, so that the data volume of the image frame inputted to the encoder is controlled from the source, and exchanging image quality for a balance of an output bit rate of the encoder under a condition of a low output bit rate can be effectively avoided. Therefore, a better balance between the image quality and the output bit rate can be achieved.

To make the foregoing objectives, features, and advantages of the present invention more comprehensible, specific embodiments of the present invention are described in detail below with reference to the accompanying drawings.

FIG. 1 is a schematic flowchart of a method for controlling a bit rate of an encoder according to an embodiment of the present invention. Referring to FIG. 1, the method for controlling a bit rate of an encoder may specifically include the following steps:

Step S110: Obtain a buffer pool state when it is detected that an image signal processor receives a to-be-processed image frame.

Step S120: Obtain a corresponding denoising intensity according to the buffer pool state.

Step S130: Output the obtained denoising intensity to the image signal processor, to enable the image signal processor to denoise the to-be-processed image frame by using the obtained denoising intensity, and output a denoised image frame to an encoder, to enable the encoder to encode the denoised image frame.

Still referring to FIG. 1, Step S110 of obtaining a buffer pool state when it is detected that an image signal processor receives a to-be-processed image frame is performed.

The buffer pool state is obtained, to provide a basis for subsequently obtaining the denoising intensity of the current to-be-processed image frame according to the buffer pool state.

A hypothetical reference decoder (HRD) model is configured to simulate a decoder. The decoder needs to receive the encoded data outputted by the encoder to determine a data change status in a buffer pool of the decoder, so that a real-time encoding status of the encoder can be correspondingly determined. Therefore, the state of the encoder can be determined by using the state of the buffer pool of the hypothetical reference decoder model.

Correspondingly, the step of obtaining a buffer pool state includes: obtaining a current data volume of a buffer pool of a hypothetical reference decoder model; and calculating a buffer pool filling degree as the buffer pool state according to the current data volume and a rated capacity of the buffer pool of the hypothetical reference decoder model.

In this embodiment, when data update is performed for the buffer pool of the hypothetical reference decoder model at the end of the processing of each image frame, the current data volume of the buffer pool of the hypothetical reference decoder model is obtained when the encoding of a previous image frame is completed. The previous image frame refers to a previous historical image frame adjacent to the to-be-processed image frame.

In this embodiment, a ratio of the current data volume of the buffer pool of the hypothetical reference decoder model to the rated capacity of the buffer pool of the hypothetical reference decoder model is used as the buffer pool filling degree. For example, when the rated capacity of the buffer pool of the hypothetical reference decoder model is M, and the current data volume of the buffer pool of the hypothetical reference decoder model is N (N≤M), it may be learned through calculation that the buffer pool filling degree is N/M.

In this embodiment, a buffer pool state is obtained when it is detected that an image signal processor receives a to-be-processed image frame, and a corresponding denoising intensity is determined subsequently according to the buffer pool state and sent to the image signal processor, to enable the image signal processor to denoise the received image frame by using the received denoising intensity.

The image signal processor (ISP) receives the to-be-processed image frame from an image sensor. The image sensor may include various types of video obtaining apparatuses, such as a video camera, a camera phone, and a video phone, or may be a computer graphics system configured to generate computer graphics video data, or any other suitable video source.

The image signal processor is configured to perform a corresponding preprocessing operation on an image frame received before encoding, including adjustment and processing of brightness, saturation, contrast, or noise level, to make an image become clearer, thereby achieving a better image display effect.

Still referring to FIG. 1, Step S120 of obtaining a corresponding denoising intensity according to the buffer pool state is performed.

The corresponding denoising intensity is obtained, and the obtained denoising intensity is subsequently sent to the image signal processor, to enable the image signal processor to denoise the current to-be-processed image frame according to the received denoising intensity.

As described above, the image signal processor performs a corresponding preprocessing operation on an image frame received before encoding, including adjustment and processing of brightness, saturation, contrast, or noise level, and the denoising operation involved therein affects the volume of encoded data and the encoding efficiency of the encoder subsequently, thereby greatly affecting an output bit rate of the encoder.

Specifically, the denoising the to-be-processed image frame by the image signal processor refers to lowering high-frequency parts including a temporal high-frequency part and a spatial high-frequency part of the to-be-processed image frame and raising low-frequency parts of the to-be-processed image frame. Therefore, a larger denoising intensity correspondingly suppresses noise better, the volume of data outputted by the image signal processor is correspondingly reduced, and the encoding efficiency of the encoder is correspondingly higher.

Therefore, the intensity of denoising the image frame by the image signal processor is controlled to adjust the volume of input data received by the encoder, so that the encoding bit rate of the encoder can be controlled, thereby controlling the output bit rate of the encoder. In addition, a sharp increase in the volume of encoded data of the encoder caused by a continuous scenario switching, continuous long-time switching of an exposure parameter, a sudden increase in noisy points, and the like can be effectively avoided, which helps the volume of encoded data of the encoder to change stably.

The buffer pool state may reflect an encoding state of the encoder. Specifically, a larger buffer pool filling degree indicates a higher encoding bit rate of the encoder; and a smaller buffer pool filling degree indicates a lower encoding bit rate of the encoder. Therefore, the intensity of denoising the to-be-processed image frame by the image signal processor is adjusted according to the buffer pool state, so that the volume of input data of the encoder can be adjusted, then the encoding bit rate of the encoder can be adjusted, and finally the output bit rate of the encoder can be controlled.

In this embodiment, the corresponding denoising intensity is obtained according to the buffer pool state, that is, the corresponding denoising intensity is obtained according to the buffer pool filling degree. In other words, there is a preset correspondence between the buffer pool filling degree and the denoising intensity. Therefore, the corresponding denoising intensity can be obtained according to the obtained buffer pool filling degree and the correspondence.

It may be understood that, when the buffer pool filling degree is larger, the buffer pool is closer to a saturation state, which correspondingly indicates that the encoding bit rate of the encoder is higher. In this case, the volume of input data inputted to the encoder needs to be correspondingly reduced, so that the intensity of denoising the to-be-processed image frame by the image signal processor should be larger. When the buffer pool filling degree is smaller, the buffer pool is farther away from the saturation state, which indicates that the encoding bit rate of the encoder is lower. In this case, the volume of input data inputted to the encoder needs to be correspondingly increased, so that the corresponding denoising intensity is smaller.

In this embodiment, the step of obtaining a corresponding denoising intensity according to the buffer pool state includes: performing matching between the buffer pool filling degree and preset threshold intervals, to obtain a corresponding matching result: and obtaining the corresponding denoising intensity according to the matching result. In other words, there is a preset correspondence between the denoising intensity and the threshold interval in which the buffer pool filling degree is located. According to the threshold interval in which the buffer pool filling degree is located, the intensity of denoising the to-be-processed image frame by the image signal processor can be obtained.

It may be understood that, each of the preset threshold intervals has an upper limit and a lower limit. Specific values of the upper limit and the lower limit of each threshold interval may be set according to an actual application requirement, and are not limited herein.

Ranges of the preset threshold intervals may be set according to an actual application requirement. For example, an upper limit and a lower limit of a threshold interval may be manually set, or video images of a specific scenario may be collected and a range of a threshold interval corresponding to the specific scenario may be formed by using the collected video images.

The denoising operation performed by the image signal processor on the to-be-processed image frame may be selected according to an actual requirement, such as time domain (1D) denoising filtering or space-time domain (3D) denoising filtering.

Using an example in which the denoising the to-be-processed image frame by the image signal processor is mean filtering in 3D denoising filtering, the step of obtaining the corresponding denoising intensity according to the matching result includes: using a first filtering window as a filtering window of the to-be-processed image frame when it is determined that the buffer pool filling degree is within a first threshold interval; using a second filtering window as a filtering window of the to-be-processed image frame when it is determined that the buffer pool filling degree is within a second threshold interval, where an upper limit of the second threshold interval is less than a lower limit of the first threshold interval, and the second filtering window is smaller than the first filtering window; using a third filtering window as a filtering window of the to-be-processed image frame when it is determined that the buffer pool filling degree is within a third threshold interval, where an upper limit of the third threshold interval is less than a lower limit of the second threshold interval, and the third filtering window is smaller than the second filtering window; using a fourth filtering window as a filtering window of the to-be-processed image frame when it is determined that the buffer pool filling degree is within a fourth threshold interval, where an upper limit of the fourth threshold interval is less than a lower limit of the third threshold interval, and the fourth filtering window is smaller than the third filtering window; and keeping a current filtering window unchanged when it is determined that the buffer pool filling degree is within a fifth threshold interval, where an upper limit of the fifth threshold interval is less than a lower limit of the fourth threshold interval.

The mean filtering refers to using a mean pixel value of all pixels in a filtering window with a pixel as a center as a filtered pixel value of the pixel in the center of the filtering window. The filtering window is generally rectangular, and has a size that is usually set to $(2n+1)*(2n+1)$, where $(2n+1)$ represents a quantity of pixels included in a length or a width of the rectangular window, and n is an integer greater than or equal to 1. Therefore, a larger filtering window indicates a better filtering effect. Correspondingly, sharpness of the image is reduced, and the image becomes more blurred. Therefore, the correspondence between the buffer pool filling degree and the denoising intensity may be set according to an actual application requirement, to achieve a balance between the encoding bit rate and image quality control.

In an example, a first filtering window (35*35) is used as a filtering window of the to-be-processed image frame when it is determined that the buffer pool filling degree is within a first threshold interval [0%, 100%]; a second filtering window (25*25) is used as a filtering window of the to-be-processed image frame when it is determined that the buffer pool filling degree is within a second threshold interval (60%, [0%]; a third filtering window (15*15) is used as a filtering window of the to-be-processed image frame when it is determined that the buffer pool filling degree is within a third threshold interval (40%, 60%]; a fourth filtering window (9*9) is used as a filtering window of the to-be-processed image frame when it is determined that the buffer pool filling degree is within a fourth threshold interval (20%, 40%]; and a current filtering window is kept unchanged when it is determined that the buffer pool filling degree is within a fifth threshold interval [0%, 20%].

It should be noted that the size of the filtering window corresponding to each threshold interval is not limited to the sizes of the filtering windows exemplified above, and may be set by a person skilled in the art according to an actual requirement. For example, a corresponding adjustment weight may be generated according to the buffer pool filling degree, and the generated adjustment weight may be used to adjust and generate the current filtering window of the image signal processor. This is not limited herein.

It can be learned from the foregoing description that, when the buffer pool filling degree is within a range of a high threshold interval, the intensity of denoising the to-be-processed image frame by the image signal processor is also maintained at a high level; and when the buffer pool filling degree is maintained within a low threshold interval, the intensity of denoising the to-be-processed image frame by the image signal processor is also at a low level. In this manner, the data volume of an image frame inputted to the encoder can be controlled from the source, to implement cyclic feedback of bit rate control of the encoder, thereby achieving a balance between image quality and a bit rate of the encoder.

Still referring to FIG. 1, Step S130 of outputting the obtained denoising intensity to the image signal processor, to enable the image signal processor to denoise the image frame by using the obtained denoising intensity, and outputting a denoised image frame to an encoder, to enable the encoder to encode the denoised image frame is performed.

The obtained denoising intensity is outputted to the image signal processor, to enable the image signal processor to denoise the image frame by using the obtained denoising intensity, so that a quantity of noisy points of the denoised image frame is reduced, to control the volume of input data of the encoder from the source, thereby avoiding, under a condition of a low output bit rate, a problem of degraded image quality caused by blindly increasing a quantization parameter. Therefore, a balance between image quality and an output bit rate can be achieved.

Then, the image signal processor outputs the denoised image frame to the encoder, to enable the encoder to encode the denoised image frame, including prediction, transform, quantization, and entropy encoding.

Still referring to FIG. 1, to further achieve a balance between image quality and an output bit rate of the encoder and improve a bit rate control speed, after the obtaining a buffer pool state, the method further includes:

Step S140 of obtaining a corresponding quantization parameter (QP) according to the buffer pool state is performed.

The corresponding quantization parameter is obtained, to provide a basis for the encoder to subsequently perform a quantization operation on the denoised image frame by using the obtained quantization parameter.

In this embodiment, the encoding operation performed by the encoder on the denoised image frame includes prediction, transform, quantization, and entropy encoding. In a quantization operation performed by the encoder, a corresponding quantization parameter is used to control a compression status of the image frame. Specifically, a larger quantization parameter indicates a larger compression loss of the image frame; and a smaller quantization parameter indicates a smaller compression loss of the image frame.

Therefore, when a buffer pool state value, namely, the buffer pool filling degree is larger, the buffer pool is closer to a saturation state, which correspondingly indicates that the encoding bit rate of the encoder is higher. In this case, the quantization parameter of the denoised image frame needs to be increased, to reduce a compression volume of the denoised image frame. When a buffer pool state value, namely, the buffer pool filling degree is smaller, the buffer pool is farther away from the saturation state, which indicates that the encoding bit rate of the encoder is lower. In this case, the quantization parameter of the denoised image frame needs to be reduced, to increase the compression volume of the denoised image frame. In this manner, the encoding bit rate and the output bit rate of the encoder can be further balanced.

For a manner of obtaining a corresponding quantization parameter according to the buffer pool state, reference may be made to an existing quantization parameter adjustment manner.

In an example, a quantization step size of a previous adjacent image frame plus 10 is used as a quantization step size of the denoised image frame when it is determined that the buffer pool filling degree is within a first preset threshold interval (90%, 100%]; a quantization step size of a previous adjacent image frame plus 6 is used as a quantization step size of the denoised image frame when it is determined that the buffer pool filling degree is within a second preset threshold interval (80%, 90%]; a quantization step size of a previous adjacent image frame plus 3 is used as a quantization step size of the denoised image frame when it is determined that the buffer pool filling degree is within a third preset threshold interval (70%, 80%]; a quantization step size of a previous adjacent image frame plus 1 is used as a quantization step size of the denoised image frame when it is determined that the buffer pool filling degree is within a fourth threshold interval (50%, 70%]; a quantization step size of a previous adjacent image frame minus 1 is used as a quantization step size of the denoised image frame when it is determined that the buffer pool filling degree is within a fifth threshold interval (40%, 50%]; a quantization step size of a previous adjacent image frame minus 2 is used as a quantization step size of the denoised image frame when it is determined that the buffer pool filling degree is within a sixth threshold interval (20%, 40%]; and a quantization step size of a previous adjacent image frame minus 4 is used as a quantization step size of the denoised image frame when it is determined that the buffer pool filling degree is within a seventh threshold interval [0%, 20%].

Still referring to FIG. 1, Step S150 of outputting the obtained quantization parameter to the encoder, to enable the encoder to quantize the denoised image frame by using the quantization parameter is performed.

The obtained quantization parameter is outputted to the encoder, to enable the encoder to quantize the denoised image frame by using the obtained quantization parameter, so that a compression volume of the denoised image frame continuously decreases, thereby further balancing an output bit rate of the encoder.

The performing bit rate control by combining the adjusting the denoising intensity by the image signal processor and the adjusting the quantization parameter in the quantization operation performed by the encoder can improve a bit rate control speed of the encoder compared with simply adjusting the quantization parameter of the to-be-processed image frame, and avoid, at a low output bit rate, degraded image quality caused by a blind increase in the quantization parameter to balance the output bit rate. Therefore, a balance between image quality and the output bit rate can be achieved, which helps maintain good image quality at a low output bit rate.

It should be noted that the numbers of the foregoing steps are used to distinguish the steps, and are not used to limit an execution sequence of the steps of the method for controlling a bit rate of an encoder in this embodiment of the present invention. For example, step S120 and step S130 may be performed simultaneously, or step S120 is performed before step S130. A person skilled in the art can make a setting according to an actual requirement.

Correspondingly, an embodiment of the present invention further provides a module for controlling a bit rate of an encoder.

FIG. 2 is a schematic structural diagram of a module for controlling a bit rate of an encoder according to an embodiment of the present invention. Referring to FIG. 2, the module 20 for controlling a bit rate of an encoder may include:

a state obtaining unit 201, configured to obtain a buffer pool state when it is detected that an image signal processor receives a to-be-processed image frame;

an intensity obtaining unit 202, configured to obtain a corresponding denoising intensity according to the buffer pool state; and an intensity output unit 203, configured to output the obtained denoising intensity to the image signal processor, to enable the image signal processor to denoise the image frame by using the obtained denoising intensity, and output a denoised image frame to an encoder, to enable the encoder to encode the denoised image frame.

The state obtaining unit 201 is configured to obtain a buffer pool state when it is detected that an image signal processor receives a to-be-processed image frame.

A Hypothetical Reference Decoder (HRD) model is configured to simulate a decoder. The decoder needs to receive the encoded data outputted by the encoder to determine a data change status in a buffer pool of the decoder, so that a real-time encoding status of the encoder can be correspondingly determined. Therefore, the state of the encoder can be determined by using the state of the buffer pool of the hypothetical reference decoder model.

Correspondingly, the step of obtaining the buffer pool state by the state obtaining unit 201 includes: obtaining a current data volume of a buffer pool of a hypothetical reference decoder model: and calculating a buffer pool filling degree as the buffer pool state according to the current data volume and a rated capacity of the buffer pool of the hypothetical reference decoder model.

In this embodiment, when data update is performed for the buffer pool of the hypothetical reference decoder model at the end of the processing of each image frame, the state obtaining unit 201 obtains the current data volume of the buffer pool of the hypothetical reference decoder model when the encoding of a previous image frame is completed. The previous image frame refers to a previous historical image frame adjacent to the to-be-processed image frame.

In this embodiment, the state obtaining unit 201 uses a ratio of the current data volume of the buffer pool of the hypothetical reference decoder model to the rated capacity of the buffer pool of the hypothetical reference decoder model as the buffer pool filling degree. For example, when the rated capacity of the buffer pool of the hypothetical reference decoder model is M, and the current data volume of the buffer pool of the hypothetical reference decoder model is N ($N \leq M$), it may be learned through calculation that the buffer pool filling degree is N/M.

In this embodiment, the state obtaining unit 201 is configured to obtain a buffer pool state when it is detected that an image signal processor receives a to-be-processed image frame, and a corresponding denoising intensity is determined subsequently according to the buffer pool state and sent to the image signal processor, to enable the image signal processor to denoise the received image frame by using the received denoising intensity.

The image signal processor receives the to-be-processed image frame from an image sensor. The image sensor may include various types of video obtaining apparatuses, such as a video camera, a camera phone, and a video phone, or may be a computer graphics system configured to generate computer graphics video data, or any other suitable video source.

The image signal processor is configured to perform a corresponding preprocessing operation on an image frame received before encoding, including adjustment and processing of brightness, saturation, contrast, or noise level, to make an image become clearer, thereby achieving a better image display effect.

The intensity obtaining unit 202 is configured to obtain a corresponding denoising intensity according to the buffer pool state.

As described above, the image signal processor performs a corresponding preprocessing operation on an image frame received before encoding, including adjustment and processing of brightness, saturation, contrast, or noise level, and the denoising operation involved therein affects the volume of encoded data and the encoding efficiency of the encoder subsequently, thereby greatly affecting an output bit rate of the encoder.

Specifically, the denoising the to-be-processed image frame by the image signal processor refers to lowering high-frequency parts including a temporal high-frequency part and a spatial high-frequency part of the to-be-processed image frame and raising low-frequency parts of the to-be-processed image frame. Therefore, a larger denoising intensity correspondingly suppresses noise better, the volume of data outputted by the image signal processor is correspondingly reduced, and the encoding efficiency of the encoder is correspondingly higher.

Therefore, the intensity of denoising the image frame by the image signal processor is controlled to adjust the volume of input data received by the encoder, so that the encoding bit rate of the encoder can be controlled. In addition, a sharp increase in the volume of encoded data of the encoder caused by a continuous scenario switching, continuous long-time switching of an exposure parameter, a sudden increase in noisy points, and the like can be effectively avoided, to enable the volume of encoded data of the encoder to change stably.

The buffer pool state may reflect an encoding state of the encoder. Specifically, a larger buffer pool filling degree indicates a higher encoding bit rate of the encoder; and a smaller buffer pool filling degree indicates a lower encoding bit rate of the encoder. Therefore, the intensity of denoising the to-be-processed image frame by the image signal processor is adjusted according to the buffer pool state, so that the volume of input data of the encoder can be adjusted, then the encoding bit rate of the encoder can be adjusted, and finally the output bit rate of the encoder can be controlled.

In this embodiment, the intensity obtaining unit 202 obtains a corresponding denoising intensity according to the buffer pool state, that is, obtains the corresponding denoising intensity according to the buffer pool filling degree. In other words, there is a preset correspondence between the buffer pool filling degree and the denoising intensity. Therefore, the intensity obtaining unit 202 can obtain the corresponding denoising intensity according to the obtained buffer pool filling degree and the correspondence.

It may be understood that, when the buffer pool filling degree is larger, the buffer pool is closer to a saturation state, which correspondingly indicates that the encoding bit rate of the encoder is higher. In this case, the volume of input data inputted to the encoder needs to be correspondingly reduced, so that the intensity of denoising the to-be-processed image frame by the image signal processor should be larger. When the buffer pool filling degree is smaller, the buffer pool is farther away from the saturation state, which indicates that the encoding bit rate of the encoder is lower. In this case, the volume of input data inputted to the encoder needs to be correspondingly increased, so that the corresponding denoising intensity is smaller.

In this embodiment, the step of obtaining a corresponding denoising intensity by the intensity obtaining unit 202 according to the buffer pool state includes: performing matching between the buffer pool filling degree and preset threshold intervals, to obtain a corresponding matching result: and obtaining the corresponding denoising intensity according to the matching result. In other words, there is a preset correspondence between the denoising intensity and the threshold interval in which the buffer pool filling degree is located. According to the threshold interval in which the buffer pool filling degree is located, the intensity of denoising the to-be-processed image frame by the image signal processor can be obtained.

Each of the preset threshold intervals has an upper limit and a lower limit. Specific values of the upper limit and the lower limit of each threshold interval may be set according to an actual application requirement, and are not limited herein.

Ranges of the preset threshold intervals may be set according to an actual application requirement. For example, an upper limit and a lower limit of a threshold interval may be manually set, or video images of a specific scenario may be collected and a range of a threshold interval corresponding to the specific scenario may be formed by using the collected video images.

The denoising operation performed by the image signal processor on the to-be-processed image frame may be selected according to an actual requirement, such as time domain (1D) denoising filtering or space-time domain (3D) denoising filtering.

Using an example in which the denoising the to-be-processed image frame by the image signal processor is mean filtering in 3D denoising filtering, the step of obtaining the corresponding denoising intensity by the intensity obtaining unit 202 according to the matching result includes: using a first filtering window as a filtering window of the to-be-processed image frame when it is determined that the buffer pool filling degree is within a first threshold interval; using a second filtering window as a filtering window of the to-be-processed image frame when it is determined that the buffer pool filling degree is within a second threshold interval, where an upper limit of the second threshold interval is less than a lower limit of the first threshold interval, and the second filtering window is smaller than the first filtering window; using a third filtering window as a filtering window of the to-be-processed image frame when it is determined that the buffer pool filling degree is within a third threshold interval, where an upper limit of the third threshold interval is less than a lower limit of the second threshold interval, and the third filtering window is smaller than the second filtering window; using a fourth filtering window as a filtering window of the to-be-processed image frame when it is determined that the buffer pool filling degree is within a fourth threshold interval, where an upper limit of the fourth threshold interval is less than a lower limit of the third threshold interval, and the fourth filtering window is smaller than the third filtering window; and keeping a current filtering window unchanged when it is determined that the buffer pool filling degree is within a fifth threshold interval, where an upper limit of the fifth threshold interval is less than a lower limit of the fourth threshold interval.

The mean filtering refers to using a mean pixel value of all pixels in a filtering window with a pixel as a center as a filtered pixel value of the pixel in the center of the filtering window. The filtering window is generally rectangular, and has a size that is usually set to $(2n+1)*(2n+1)$, where n is an integer greater than or equal to 1. Therefore, a larger filtering window indicates a better filtering effect. Correspondingly, sharpness of the image is reduced, and the image becomes more blurred. Therefore, the correspondence between buffer pool filling degree and the denoising intensity may be set according to an actual application requirement, to achieve a balance between the encoding bit rate and image quality control.

In an example, the intensity obtaining unit 202 uses a first filtering window ($35*35$) as a filtering window of the to-be-processed image frame when it is determined that the buffer pool filling degree is within a first threshold interval ($80\%$, $100\%$]; uses a second filtering window ($25*25$) as a filtering window of the to-be-processed image frame when it is determined that the buffer pool filling degree is within a second threshold interval ($60\%$, $80\%$]; uses a third filtering window ($15*15$) as a filtering window of the to-be-processed image frame when it is determined that the buffer pool filling degree is within a third threshold interval ($40\%$, $60\%$]; uses a fourth filtering window ($9*9$) as a filtering window of the to-be-processed image frame when it is determined that the buffer pool filling degree is within a fourth threshold interval ($20\%$, $40\%$]; and keeps a current filtering window unchanged when it is determined that the buffer pool filling degree is within a fifth threshold interval [$0\%$, $20\%$].

It should be noted that the size of the filtering window corresponding to each threshold interval is not limited to the sizes of the filtering windows exemplified above, and may be set by a person skilled in the art according to an actual requirement. For example, a corresponding adjustment weight may be generated according to the buffer pool filling degree, and the generated adjustment weight may be used to adjustthe current filtering window of the image signal processor. This is not limited herein.

It can be learned from the foregoing description that, when the buffer pool filling degree is within a range of a high threshold interval, the intensity of denoising the to-be-processed image frame by the image signal processor is also maintained at a high level; and when the buffer pool filling degree is maintained within a low threshold interval, the intensity of denoising the to-be-processed image frame by the image signal processor is also at a low level. In this manner, the data volume of an image frame inputted to the encoder can be controlled from the source, to implement cyclic feedback of bit rate control of the encoder, thereby achieving a balance between image quality and a bit rate of the encoder.

The intensity output unit 203 is configured to output the obtained denoising intensity to the image signal processor, to enable the image signal processor to denoise the image frame by using the obtained denoising intensity, and output a denoised image frame to an encoder, to enable the encoder to encode the denoised image frame.

The intensity output unit 203 outputs the obtained denoising intensity to the image signal processor, to enable the image signal processor to denoise the image frame by using the obtained denoising intensity, so that a quantity of noisy points of the denoised image frame is reduced, to control the volume of input data of the encoder from the source, thereby avoiding, under a condition of a low output bit rate, a problem of degraded image quality caused by blindly increasing a quantization parameter. Therefore, a balance between image quality and an output bit rate can be achieved.

Then, the image signal processor outputs the denoised image frame to the encoder, to enable the encoder to encode the denoised image frame, including prediction, transform, quantization, and entropy encoding.

In this embodiment, to further achieve a balance between image quality and an output bit rate of the encoder and improve a bit rate control speed, the module 20 further includes a parameter obtaining unit 204 and a parameter output unit 205.

The parameter obtaining unit 204 is configured to obtain a corresponding quantization parameter according to the buffer pool state after the buffer pool state is obtained: and the parameter output unit 205 is configured to output the obtained quantization parameter to the encoder, to enable the encoder to quantize the denoised image frame by using the quantization parameter.

The parameter obtaining unit 204 is configured to obtain a corresponding quantization parameter according to the buffer pool state after the buffer pool state is obtained.

In this embodiment, the encoding operation performed by the encoder on the denoised image frame includes prediction, transform, quantization, and entropy encoding. In a quantization operation performed by the encoder, a corresponding quantization parameter is used to control a compression status of the image frame. Specifically, a larger quantization parameter indicates a larger compression loss of the image frame; and a smaller quantization parameter indicates a smaller compression loss of the image frame.

Therefore, when a buffer pool state value, namely, the buffer pool filling degree is larger, the buffer pool is closer to a saturation state, which correspondingly indicates that the encoding bit rate of the encoder is higher. In this case, the parameter obtaining unit 204 can increase the quantization parameter of the denoised image frame, to reduce a compression volume of the image frame. When a buffer pool state value, namely, the buffer pool filling degree is smaller, the buffer pool is farther away from the saturation state, which indicates that the encoding bit rate of the encoder is lower. In this case, the parameter obtaining unit 204 can reduce the quantization parameter of the denoised image frame, to increase the compression volume of the image frame. In this manner, the encoding bit rate and the output bit rate of the encoder can be further balanced.

For a manner of obtaining a corresponding quantization parameter by the parameter obtaining unit 204 according to the buffer pool state, reference may be made to an existing quantization parameter adjustment manner.

In an example, the parameter obtaining unit 204 may use a quantization step size of a previous adjacent image frame plus 10 as a quantization step size of the denoised image frame when it is determined that the buffer pool filling degree is within a first preset threshold interval (90%, 100%]; use a quantization step size of a previous adjacent image frame plus 6 as a quantization step size of the denoised image frame when it is determined that the buffer pool filling degree is within a second preset threshold interval (80%, 90%]; use a quantization step size of a previous adjacent image frame plus 3 as a quantization step size of the denoised image frame when it is determined that the buffer pool filling degree is within a third preset threshold interval (70%, 80%]; use a quantization step size of a previous adjacent image frame plus 1 as a quantization step size of the denoised image frame when it is determined that the buffer pool filling degree is within a fourth threshold interval (50%, 70%]; use a quantization step size of a previous adjacent image frame minus 1 as a quantization step size of the denoised image frame when it is determined that the buffer pool filling degree is within a fifth threshold interval (40%, 50%]; use a quantization step size of a previous adjacent image frame minus 2 as a quantization step size of the denoised image frame when it is determined that the buffer pool filling degree is within a sixth threshold interval (20%, 40%]; and use a quantization step size of a previous adjacent image frame minus 4 as a quantization step size of the denoised image frame when it is determined that the buffer pool filling degree is within a seventh threshold interval [0%, 20%].

The parameter output unit 205 is configured to output the obtained quantization parameter to the encoder, to enable the encoder to quantize the denoised image frame by using the quantization parameter.

The parameter output unit 205 outputs the obtained quantization parameter to the encoder, to enable the encoder to quantize the denoised image frame by using the obtained quantization parameter, so that a compression volume of the denoised image frame continuously decreases, thereby further balancing an output bit rate of the encoder.

In the module for controlling a bit rate of an encoder in this embodiment, the performing bit rate control by combining the adjusting the denoising intensity by the image signal processor and the adjusting the quantization parameter in the quantization operation performed by the encoder can improve a bit rate control speed of the encoder compared with simply adjusting the quantization parameter of the to-be-processed image frame, and avoid, at a low output bit rate, degraded image quality caused by a blind increase in the quantization parameter to balance the output bit rate. Therefore, a balance between image quality and the output bit rate can be achieved, which helps maintain good image quality at a low output bit rate.

Correspondingly, an embodiment of the present invention further provides a chip, where the chip is integrated with the module for controlling a bit rate of an encoder. For the module for controlling a bit rate of an encoder, reference is made to the descriptions in the foregoing part. Details are not described herein again.

Correspondingly, an embodiment of the present invention further provides an electronic device, including at least one memory and at least one processor, where the memory stores one or more computer instructions, and the one or more computer instructions are executed by the processor to implement the method for controlling a bit rate of an encoder.

An optional hardware structure of the electronic device provided in this embodiment of the present invention may be shown in FIG. 3, and includes: at least one processor 01, at least one communication interface 02, at least one memory 03, and at least one communication bus 04.

In this embodiment of the present invention, there are at least one processor 01, at least one communications interface 02, at least one memory 03, and at least one communications bus 04, and the processor 01, the communications interface 02, and the memory 03 complete mutual communication through the communications bus 04.

The communication interface 02 may be an interface of a communication module for network communication, for example, an interface of a GSM module.

The processor 01 may be a Central Processing Unit (CPU) or an Application Specific Integrated Circuit (ASIC) or may be configured as one or more integrated circuits for implementing the embodiments of the present invention.

The memory 03 may include a high-speed random access memory (RAM), or may further include a non-volatile memory, for example, at least one magnetic disk storage.

The memory 03 stores one or more computer instructions, the one or more computer instructions being executed by the processor 01 to implement the method for controlling a bit rate of an encoder in the embodiments of the present invention.

It should be noted that the foregoing terminal device for implementation may further include other devices (not shown) that may not be necessary for the invention content of the embodiments of the present invention. Since the other devices may not be necessary for understanding the invention content of the embodiments of the present invention, the devices are not to be described one by one in the embodiments of the present invention.

An embodiment of the present invention further provides a storage medium, where the storage medium stores one or more computer instructions, and the one or more computer instructions are used to implement the method for controlling a bit rate of an encoder provided in this embodiment of the present invention.

The implementations of the present invention described above are a combination of elements and features of the present invention. The elements or features may be considered selective unless otherwise mentioned. Each element or feature may be practiced without being combined with another element or feature. In addition, the implementations of the present invention may be configured by combining a part of elements and/or features. The order of operations described in the implementations of the present invention may be rearranged. Some configurations of any implementation may be included in another implementation and may be replaced with corresponding configurations of another implementation. It is obvious to a person skilled in the art that claims that do not have a clear reference relationship with each other may be combined into an implementation of the present invention, or may be included as new claims in amendments after the filing of this application.

The implementations of the present invention can be implemented by various means such as hardware, firmware, software, or a combination thereof. In a hardware configuration mode, the method according to the exemplary embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

In a firmware or software configuration mode, the implementations of the present invention may be implemented in the form of modules, processes, functions, and the like. Software code may be stored in a memory unit and executed by a processor. The memory unit is located inside or outside the processor and can send data to and receive data from the processor by various known means.

The foregoing descriptions of the disclosed embodiments enable a person skilled in the art to implement or use the present invention. Various modifications to these embodiments are obvious to a person skilled in the art, and the general principles defined in this specification may be implemented in other embodiments without departing from the spirit or scope of the present invention. Therefore, the present invention is not limited to these embodiments illustrated herein, but conforms to the broadest scope consistent with the principles and novel features disclosed in the present invention.

Although the present invention is disclosed above, the present invention is not limited thereto. A person skilled in the art can make various changes and modifications without departing from the spirit and the scope of the present invention. Therefore, the protection scope of the present invention should be subject to the scope defined by the claims.

What is claimed is:

1. A method for controlling a bit rate of an encoder, comprising:
   obtaining a buffer pool state when it is detected that an image signal processor receives a to-be-processed image frame, wherein the obtaining a buffer pool state comprises:
      obtaining a current data volume of a buffer pool of a hypothetical reference decoder model; and
      calculating a buffer pool filling degree as the buffer pool state according to the current data volume and a rated capacity of the buffer pool of the hypothetical reference decoder model;
   obtaining a corresponding denoising intensity according to the buffer pool state; and
   outputting the denoising intensity to the image signal processor, to enable the image signal processor to denoise the image frame by using the denoising intensity, and outputting a denoised image frame to an encoder, to enable the encoder to encode the denoised image frame.

2. The method for controlling a bit rate of an encoder according to claim 1, wherein the calculating a buffer pool filling degree according to the current data volume and a rated capacity of the buffer pool of the hypothetical reference decoder model comprises:

using a ratio of the current data volume to the rated capacity of the buffer pool of the hypothetical reference decoder model as the buffer pool filling degree.

3. The method for controlling a bit rate of an encoder according to claim 1, wherein the obtaining a corresponding denoising intensity according to the buffer pool state comprises:

performing matching between the buffer pool filling degree and preset threshold intervals, to obtain a corresponding matching result; and obtaining the corresponding denoising intensity according to the matching result.

4. The method for controlling a bit rate of an encoder according to claim 3, wherein the denoising is mean filtering; and the obtaining the corresponding denoising intensity according to the matching result comprises:

using a first filtering window as a filtering window of the current image frame when it is determined that the buffer pool filling degree is within a first threshold interval;

using a second filtering window as a filtering window of the to-be-processed image frame when it is determined that the buffer pool filling degree is within a second threshold interval, wherein an upper limit of the second threshold interval is less than a lower limit of the first threshold interval, and the second filtering window is smaller than the first filtering window;

using a third filtering window as a filtering window of the to-be-processed image frame when it is determined that the buffer pool filling degree is within a third threshold interval, wherein an upper limit of the third threshold interval is less than a lower limit of the second threshold interval, and the third filtering window is smaller than the second filtering window;

using a fourth filtering window as a filtering window of the to-be-processed image frame when it is determined that the buffer pool filling degree is within a fourth threshold interval, wherein an upper limit of the fourth threshold interval is less than a lower limit of the third threshold interval, and the fourth filtering window is smaller than the third filtering window; and keeping a current filtering window unchanged when it is determined that the buffer pool filling degree is within a fifth threshold interval, wherein an upper limit of the fifth threshold interval is less than a lower limit of the fourth threshold interval.

5. The method for controlling a bit rate of an encoder according to claim 4, wherein:

the first threshold interval is (80%, 100%], and a size of the first filtering window is (35*35);

the second threshold interval is (60%, 80%], and a size of the second filtering window is (25*25);

the third threshold interval is (40%, 60%], and a size of the third filtering window is (15*15);

the fourth threshold interval is (20%, 40%], and a size of the fourth filtering window is (9*9); and the fifth threshold interval is [0%, 20%].

6. The method for controlling a bit rate of an encoder according to claim 1, wherein after the obtaining a buffer pool state, the method further comprises:

obtaining a corresponding quantization parameter according to the buffer pool state; and outputting the obtained quantization parameter to the encoder, to enable the encoder to quantize the denoised image frame by using the quantization parameter.

7. An electronic device, comprising at least one memory and at least one processor, wherein the memory stores one or more computer instructions, executable by the processor to implement a method for controlling a bit rate of an encoder, the method comprising:

obtaining a buffer pool state when it is detected that an image signal processor receives a to-be-processed image frame, wherein the obtaining a buffer pool state comprises:

obtaining a current data volume of a buffer pool of a hypothetical reference decoder model; and calculating a buffer pool filling degree as the buffer pool state according to the current data volume and a rated capacity of the buffer pool of the hypothetical reference decoder model;

obtaining a corresponding denoising intensity according to the buffer pool state; and outputting the denoising intensity to the image signal processor, to enable the image signal processor to denoise the image frame by using the denoising intensity, and outputting a denoised image frame to an encoder, to enable the encoder to encode the denoised image frame.

8. The electronic device according to claim 7, wherein the calculating a buffer pool filling degree according to the current data volume and a rated capacity of the buffer pool of the hypothetical reference decoder model comprises:

using a ratio of the current data volume to the rated capacity of the buffer pool of the hypothetical reference decoder model as the buffer pool filling degree.

9. The electronic device according to claim 7, wherein the obtaining a corresponding denoising intensity according to the buffer pool state comprises:

performing matching between the buffer pool filling degree and preset threshold intervals, to obtain a corresponding matching result; and obtaining the corresponding denoising intensity according to the matching result.

10. The electronic device according to claim 9, wherein the denoising is mean filtering; and the obtaining the corresponding denoising intensity according to the matching result comprises:

using a first filtering window as a filtering window of the current image frame when it is determined that the buffer pool filling degree is within a first threshold interval;

using a second filtering window as a filtering window of the to-be-processed image frame when it is determined that the buffer pool filling degree is within a second threshold interval, wherein an upper limit of the second threshold interval is less than a lower limit of the first threshold interval, and the second filtering window is smaller than the first filtering window;

using a third filtering window as a filtering window of the to-be-processed image frame when it is determined that the buffer pool filling degree is within a third threshold interval, wherein an upper limit of the third threshold interval is less than a lower limit of the second threshold interval, and the third filtering window is smaller than the second filtering window;

using a fourth filtering window as a filtering window of the to-be-processed image frame when it is determined that the buffer pool filling degree is within a fourth threshold interval, wherein an upper limit of the fourth threshold interval is less than a lower limit of the third threshold interval, and the fourth filtering window is smaller than the third filtering window; and keeping a current filtering window unchanged when it is determined that the buffer pool filling degree is within a fifth threshold interval, wherein an upper limit of the fifth threshold interval is less than a lower limit of the fourth threshold interval.

11. The electronic device according to claim 10, wherein:

the first threshold interval is (80%, 100%], and a size of the first filtering window is (35*35);

the second threshold interval is (60%, 80%], and a size of the second filtering window is (25*25);

the third threshold interval is (40%, 60%], and a size of the third filtering window is (15*15);

the fourth threshold interval is (20%, 40%], and a size of the fourth filtering window is (9*9); and the fifth threshold interval is [0%, 20%].

12. The electronic device according to claim 7, wherein after the obtaining a buffer pool state, the method further comprises:

obtaining a corresponding quantization parameter according to the buffer pool state; and outputting the obtained quantization parameter to the encoder, to enable the encoder to quantize the denoised image frame by using the quantization parameter.

13. A non-transitory storage medium, wherein the storage medium stores one or more computer instructions, and the one or more computer instructions are used to implement a method for controlling a bit rate of an encoder, comprising:

obtaining a buffer pool state when it is detected that an image signal processor receives a to-be-processed image frame, wherein the obtaining a buffer pool state comprises:

obtaining a current data volume of a buffer pool of a hypothetical reference decoder model; and calculating a buffer pool filling degree as the buffer pool state according to the current data volume and a rated capacity of the buffer pool of the hypothetical reference decoder model;

obtaining a corresponding denoising intensity according to the buffer pool state; and outputting the denoising intensity to the image signal processor, to enable the image signal processor to denoise the image frame by using the denoising intensity, and outputting a denoised image frame to an encoder, to enable the encoder to encode the denoised image frame.

14. The storage medium according to claim 13, wherein the calculating a buffer pool filling degree according to the current data volume and a rated capacity of the buffer pool of the hypothetical reference decoder model comprises:

using a ratio of the current data volume to the rated capacity of the buffer pool of the hypothetical reference decoder model as the buffer pool filling degree.

15. The storage medium according to claim 13, wherein the obtaining a corresponding denoising intensity according to the buffer pool state comprises:

performing matching between the buffer pool filling degree and preset threshold intervals, to obtain a corresponding matching result; and obtaining the corresponding denoising intensity according to the matching result.

16. The storage medium according to claim 15, wherein the denoising is mean filtering; and the obtaining the corresponding denoising intensity according to the matching result comprises:

using a first filtering window as a filtering window of the current image frame when it is determined that the buffer pool filling degree is within a first threshold interval;

using a second filtering window as a filtering window of the to-be-processed image frame when it is determined that the buffer pool filling degree is within a second threshold interval, wherein an upper limit of the second threshold interval is less than a lower limit of the first threshold interval, and the second filtering window is smaller than the first filtering window;

using a third filtering window as a filtering window of the to-be-processed image frame when it is determined that the buffer pool filling degree is within a third threshold interval, wherein an upper limit of the third threshold interval is less than a lower limit of the second threshold interval, and the third filtering window is smaller than the second filtering window;

using a fourth filtering window as a filtering window of the to-be-processed image frame when it is determined that the buffer pool filling degree is within a fourth threshold interval, wherein an upper limit of the fourth threshold interval is less than a lower limit of the third threshold interval, and the fourth filtering window is smaller than the third filtering window; and keeping a current filtering window unchanged when it is determined that the buffer pool filling degree is within a fifth threshold interval, wherein an upper limit of the fifth threshold interval is less than a lower limit of the fourth threshold interval.

17. The storage medium according to claim 16, wherein:

the first threshold interval is (80%, 100%], and a size of the first filtering window is (35*35);

the second threshold interval is (60%, 80%], and a size of the second filtering window is (25*25);

the third threshold interval is (40%, 60%], and a size of the third filtering window is (15*15);

the fourth threshold interval is (20%, 40%], and a size of the fourth filtering window is (9*9); and the fifth threshold interval is [0%, 20%].

* * * * *